United States Patent
Batra et al.

(10) Patent No.: US 11,610,350 B2
(45) Date of Patent: Mar. 21, 2023

(54) AUTOMATICALLY FILLING A GEOMETRIC SHAPE WITH GRAPHICAL CELLS ALIGNED WITH THE GEOMETRIC SHAPE

(71) Applicant: Adobe Inc., San Jose, CA (US)

(72) Inventors: Vineet Batra, Pitam Pura (IN); Praveen Kumar Dhanuka, Howrah (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 17/394,985

(22) Filed: Aug. 5, 2021

(65) Prior Publication Data
US 2023/0058129 A1    Feb. 23, 2023

(51) Int. Cl.
*G06T 11/40* (2006.01)
*G06T 3/60* (2006.01)

(52) U.S. Cl.
CPC .......... *G06T 11/40* (2013.01); *G06T 3/60* (2013.01)

(58) Field of Classification Search
CPC .................. G06T 11/40; G06T 3/60
See application file for complete search history.

(56) References Cited

U.S. PATENT DOCUMENTS

| | | | | |
|---|---|---|---|---|
| 6,822,652 B1* | 11/2004 | Browne | ......... | G06T 11/40 345/619 |
| 7,495,670 B1* | 2/2009 | Manzari | ......... | G06T 11/203 345/581 |
| 8,549,420 B1* | 10/2013 | Tibbett | ......... | G06F 3/04812 715/767 |
| 9,019,303 B2* | 4/2015 | Lee | ......... | G06T 11/20 345/620 |
| 10,482,622 B2 | 11/2019 | Worthington | | |
| 10,832,446 B2 | 11/2020 | Phogat et al. | | |
| 11,164,343 B1 | 11/2021 | Batra et al. | | |
| 2005/0168476 A1 | 8/2005 | Levene et al. | | |
| 2006/0290695 A1* | 12/2006 | Salomie | ......... | G06T 17/20 345/423 |
| 2008/0297514 A1* | 12/2008 | Pedersen | ......... | G06T 11/40 345/442 |
| 2011/0216976 A1 | 9/2011 | Rother et al. | | |
| 2013/0120426 A1 | 5/2013 | Diverdi | | |

(Continued)

FOREIGN PATENT DOCUMENTS

CN    102538706 A    7/2012

OTHER PUBLICATIONS

F de Goes, M Desbrun, Y Tong, "Vector field processing on triangle meshes", ACM SIGGRAPH 2016 Courses, 2016—dl.acm.org (Year: 2016).*

(Continued)

*Primary Examiner* — Michael Le
(74) *Attorney, Agent, or Firm* — FIG. 1 Patents

(57) ABSTRACT

A fill pattern alignment system fills a geometric shape with a graphical cell in accordance with a pattern and aligned with the contours of the geometric shape. The intrinsic shape of the geometric shape being filled is determined and an orientation for the graphical cell at each location in the pattern is determined based on the intrinsic shape of the geometric shape. Accordingly, the orientation for each graphical cell being used to fill the geometric shape is variable based on the location of the graphical cell and the intrinsic shape of the geometric shape.

20 Claims, 12 Drawing Sheets

(56) References Cited

U.S. PATENT DOCUMENTS

| | | |
|---|---|---|
| 2016/0350942 A1 | 12/2016 | Asente et al. |
| 2017/0372455 A1 | 12/2017 | Winneemoeller et al. |
| 2018/0322612 A1 | 11/2018 | Asente et al. |
| 2020/0219287 A1* | 7/2020 | Phogat .................. G06T 17/20 |
| 2020/0242823 A1* | 7/2020 | Gehlaut .................. G06T 11/40 |

OTHER PUBLICATIONS

Batra, Vineet et al., "U.S. Application as Filed", U.S. Appl. No. 17/504,814, filed Oct. 19, 2021, 59 pages.

Batra, Vineet et al., "U.S. Application as Filed", U.S. Appl. No. 17/476,834, filed Sep. 16, 2021, 49 pages.

Blum, Harry et al., "Shape description using weighted symmetric axis features", Pattern Recognition, vol. 10, No. 3 [retrieved Aug. 17, 2021], Retrieved from the Internet <http://www.sci.utah.edu/~gerig/CS7960-S2010/handouts/shapedescriptors_blum.pdf>., 1978, 17 Pages.

Brandt, Jonathan W., "Theory and application of the skeleton representation of continuous shapes", Doctoral dissertation, University of California, Davis, Division of Computer Science 4455 Chem. Annex Davis, CA, United States [retrieved Oct. 20, 2021], UMI Order No. GAX92-17565, 1992, 219 pages.

Choi, Hyeong In et al., "Mathematical theory of medial axis transform", Pacific Journal of Mathematics vol. 181, No. 1 [retrieved Aug. 17, 2021], Retrieved from the Internet <https://msp.org/pjm/1997/181-1/pjm-v181-n1-p02-p.pdf>., Nov. 1997, 32 Pages.

Choi, Hyeong In et al., "New Algorithm for Medial Axis Transform of Plane Domain", Graphical Models and Image Processing, vol. 59, No. 6 [retrieved Oct. 6, 2021], Retrieved from the Internet <https://doi.org/10.1006/gmip.1997.0444>., Nov. 1997, 21 pages.

Lee, D. T., "Medial Axis Transformation of a Planar Shape", IEEE Transactions on Pattern Analysis and Machine Intelligence, vol. PAMI-4, No. 4 [retrieved Aug. 17, 021]. Retrieved from the Internet <https://doi.org/10.1109/TPAMI.1982.4767267>., Jul. 1982, 7 Pages.

Shewchuk, Jonathan R., "Triangle: Engineering a 2D Quality Mesh Generator and Delaunay Triangulator", Workshop on Applied Computational Geometry, Springer, Berlin [retrieved Apr. 13, 2021]. Retrieved from the Internet <https://doi.org/10.1007/BFb0014497>., May 1996, 10 pages.

U.S. Appl. No. 17/476,834, "Non-Final Office Action", U.S. Appl. No. 17/476,834, dated Aug. 30, 2022, 10 pages.

"Corrected Notice of Allowability", U.S. Appl. No. 17/476,834, dated Feb. 2, 2023, 2 pages.

"Notice of Allowance", U.S. Appl. No. 17/476,834, dated Jan. 19, 2023, 8 pages.

* cited by examiner

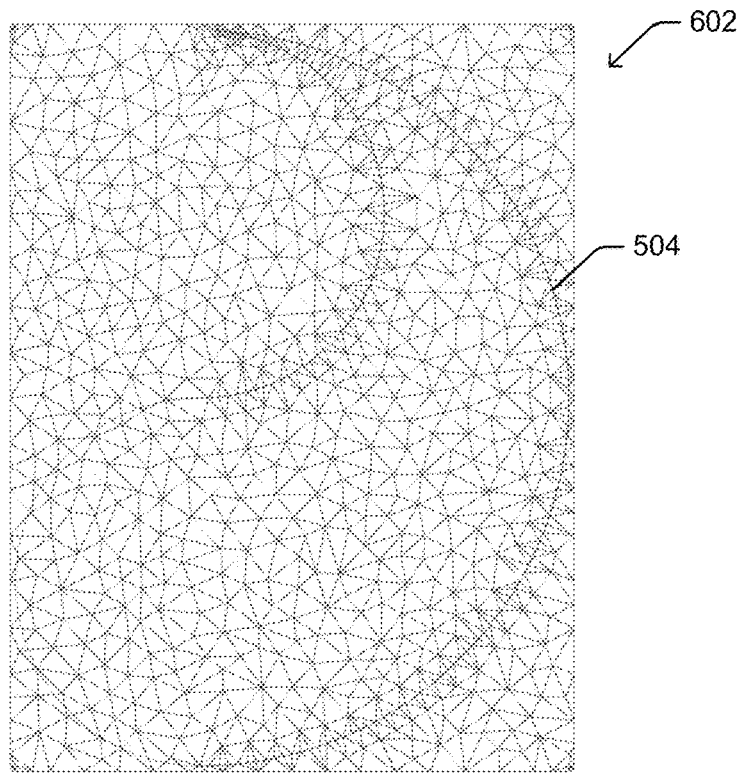
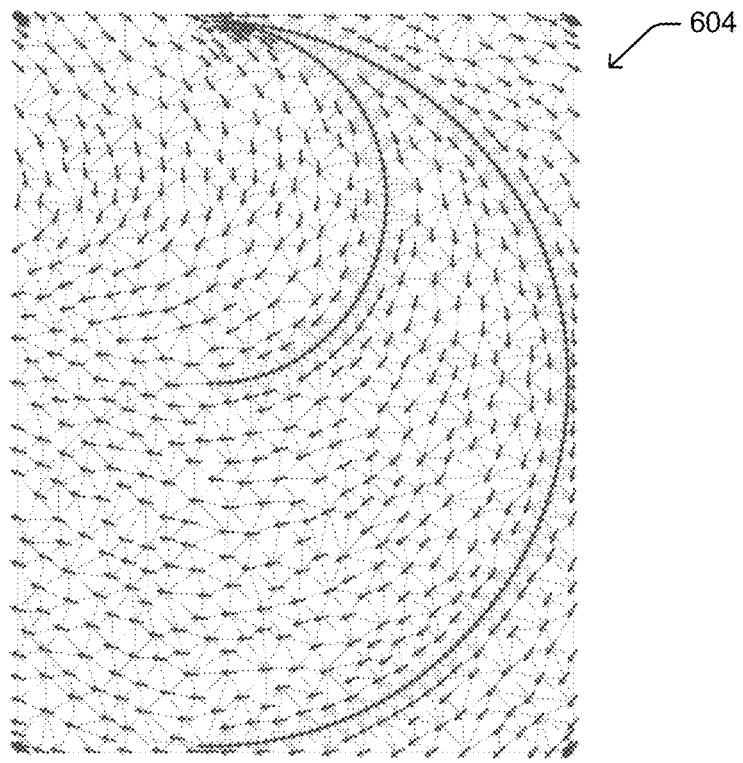
Fig. 6

AUTOMATICALLY FILLING A GEOMETRIC SHAPE WITH GRAPHICAL CELLS ALIGNED WITH THE GEOMETRIC SHAPE

BACKGROUND

As computer technology has advanced computers have become increasingly commonplace in our lives and have found a wide variety of different uses. One such use is creating digital content, where users generate and edit digital content such as images in a variety of different manners. This digital content is useable in various different scenarios, such as screen design, apparel design, packaging, and so forth.

One feature frequently found in digital content creation is patterns. Patterns refer to repeated occurrences of cells that include any of a variety of shapes, images, colors, and so forth. While providing support for these patterns and the resulting grid-like arrangement of the cells is useful, it is not without its problems. One such problem is that control of these patterns is typically limited. For example, users oftentimes are able to select the content in the cells as well as the horizontal and vertical spacing between the cells. However, conventional digital content creation solutions typically give users little or no other control over the manner in which these patterns are applied, oftentimes frustrating users and leaving them dissatisfied with their computers and applications.

SUMMARY

To mitigate the drawings of digital content creation solutions, a fill pattern alignment system as implemented by a computing device is described to provide automatically filling a geometric shape with graphical cells aligned with the geometric shape. A geometric shape in digital content is identified and a graphical cell with which to fill the geometric shape in accordance with a pattern is received. A medial axis of the geometric shape is determined, the medial axis including a set of points in the geometric shape that have more than one closest point on a boundary of the geometric shape. For each of multiple locations of the geometric shape where the graphical cell is to be placed in accordance with the pattern, based at least in part on the medial axis, an orientation for the graphical cell at the location that aligns the graphical cell with the medial axis is determined, and at the location the graphical cell with the determined orientation is displayed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 illustrates an example of a triangular mesh including generated for a geometric shape having a boundary.

DETAILED DESCRIPTION

Overview

Figure 1:
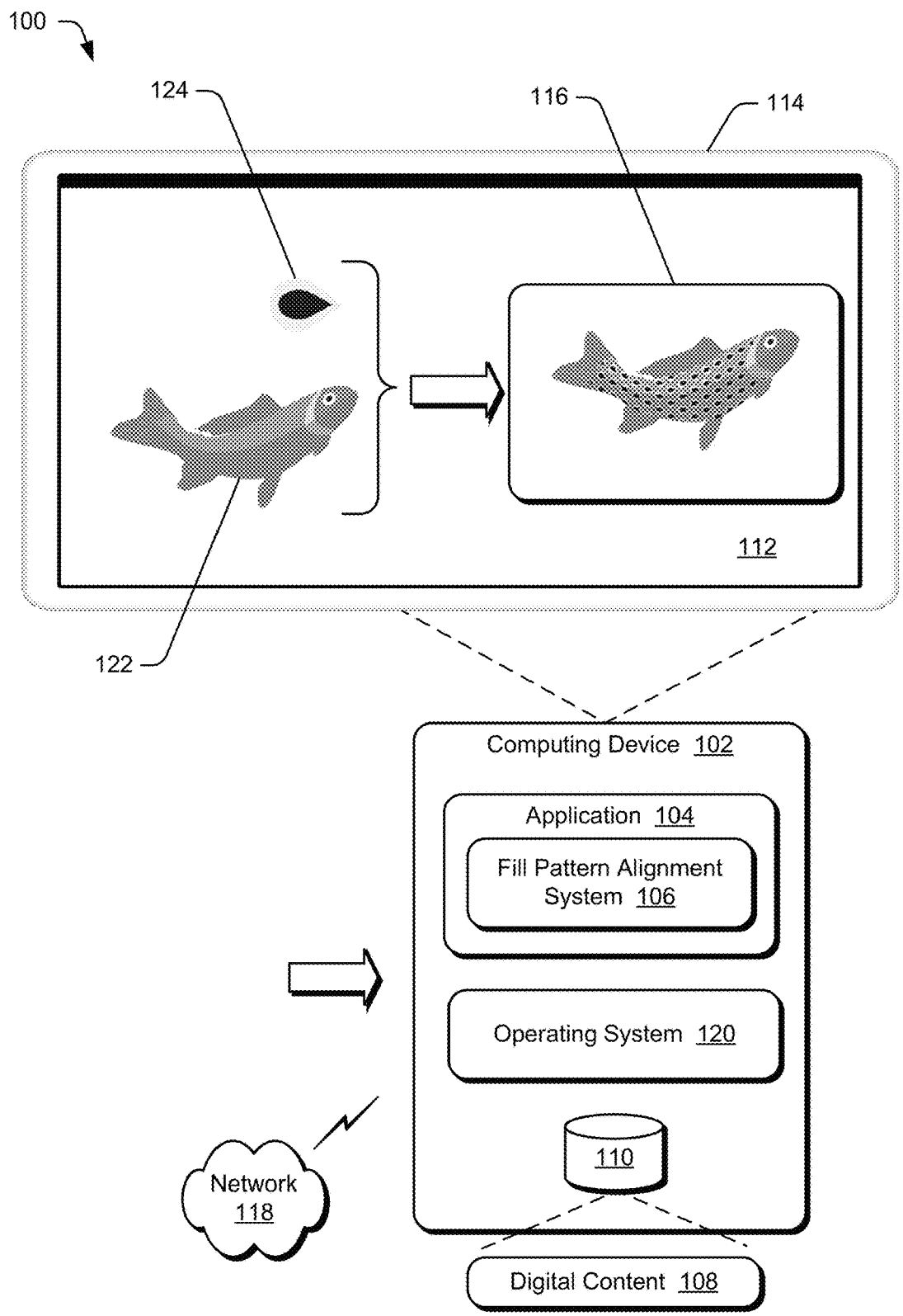
FIG. 1 is an illustration of a digital medium environment in an example implementation that is operable to employ the automatically filling a geometric shape with graphical cells aligned with the geometric shape described herein.

Current solutions for filling geometric shapes with patterns provide limited control over these patterns. For example, current solutions allow users to select the content in the cells used in a pattern as well as select the horizontal and vertical spacing between the cells used in a pattern. Conventional solutions for filling geometric shapes with patterns typically give users little or no other control over the manner in which these patterns are applied.

To overcome these problems, techniques for automatically filling a geometric shape with graphical cells aligned with the geometric shape are discussed herein. Generally, the techniques discussed herein fill a geometric shape with a graphical cell in accordance with a pattern and aligned with the contours of the geometric shape. The intrinsic shape of the geometric shape being filled is determined and an orientation for the graphical cell at each location in the pattern is determined based on the intrinsic shape. Accordingly, the orientation for each graphical cell being used to fill the geometric shape is variable based on the location of the graphical cell and the intrinsic shape of the geometric shape.

More specifically, a medial axis (also referred to as a skeleton or straight-edge skeleton) is generated for a geometric shape. The medial axis of the geometric shape is a set of points (e.g., all points) in the geometric shape that have more than one closest point on the boundary of the geometric shape. The medial axis identifies the intrinsic shape of the geometric shape.

Salient boundary segments are also generated for the geometric shape. The salient boundary segments for the geometric shape refer to segments or portions of the boundary of the geometric shape that are aligned with the medial axis. Segments of the boundary of the geometric shape that are aligned with the corresponding segment of the medial axis are identified by comparing a boundary tangential line to a medial axis tangential line. The boundary tangential line is a line that is tangential to, and in the same direction as, a segment of the boundary. The medial axis tangential line is a line that is tangential to, and in the same direction as, the segment of the medial axis. In one or more implementations, if the angle between a boundary tangential line and a corresponding medial axis tangential line is within a threshold range (e.g., less than a threshold amount, such as 45 degrees), then the segment of the boundary of the geometric shape is aligned, with the same orientation, with the corresponding segment of the medial axis. If the angle between a boundary tangential line and a corresponding medial axis tangential line is between 135 degrees and 225 degrees, the segment of the boundary of the geometric shape is aligned, with reverse orientation, with the corresponding segment of the medial axis.

A mesh (e.g., a triangular mesh) is generated based on the salient boundary segments. In one or more implementations, a bounding box that includes the geometric shape is identified and a mesh for the bounding box is generated. Points along the geometric shape (e.g., points along the salient boundary segments) are sampled and included as vertexes in generating the mesh (e.g., adds the sampled points as Steiner points before generating the mesh). In one or more implementations, a beginning location on the geometric shape is selected (e.g., a point that is the top-most and/or left-most on the geometric shape) and included as a sampled point. The geometric shape is traversed point by point (e.g., pixel by pixel) from the beginning location and each additional point is analyzed relative to the previously sampled point. If one or more conditions are satisfied (e.g., the number of points between the current point and the previously sampled point exceeds a threshold number (e.g., 10), the difference between the angle of the tangent to the geometric shape at the current point and the angle of the tangent to the geometric shape at the previously sampled point exceeds a threshold amount (e.g., 3 degrees)) then the current location is included as a sampled point. Otherwise the current location is not included as a sampled point. By including points along the geometric shape as vertexes in generating the mesh, the boundary of the geometric shape is accounted for when further analyzing the mesh.

Boundary conditions used in generating a smooth directional vector field are determined. Direction vectors corresponding to the vertices of the mesh that are located on the salient boundary segments are determined. The direction vector corresponding to a vertex of the mesh that is located on the salient boundary segments is a vector identifying the direction of the boundary tangential line at that vertex (the direction of a line that is tangential to, and in the same direction as, the segment of the boundary that includes the vertex). The direction vectors corresponding to the vertices are represented in various manners, e.g., as two dimensional vectors [sin θ, cos θ].

Analogous to the discussion above, if the angle between a boundary tangential line at a vertex and a corresponding medial axis tangential line is between 135 degrees and 225 degrees, the segment of the boundary of the geometric shape is aligned, with reverse orientation, with the corresponding segment of the medial axis. In such situations the direction of the boundary tangential line is reversed, resulting in the boundary tangential line being aligned with the same orientation as the corresponding medial axis tangential line resulting in the angle between the reversed boundary tangential line and the corresponding medial axis tangential line being within a threshold range (e.g., less than a threshold amount, such as 45 degrees).

The smooth directional vector field is generated from the boundary conditions and the mesh. The smooth directional vector field being smooth refers to the direction vectors in the smooth directional vector field being similar in direction (e.g., less than a threshold number of degrees different, such as 5 degrees) as adjacent direction vectors in the smooth directional vector field. In one or more implementations the smooth directional vector field is generated across the entire mesh. Additionally or alternatively, the smooth directional vector field is generated for only portion of the mesh (e.g., portions of the mesh in the interior of the geometric shape, including portions of the mesh on the boundary of the geometric shape).

For each vertex on a salient boundary segment, the direction vector for the vertex is the boundary tangential line at the vertex (or the boundary tangential line with reverse orientation if the angle between a boundary tangential line at a vertex and a corresponding medial axis tangential line is between 135 degrees and 225 degrees as discussed above). These direction vectors (e.g., each represented as a two dimensional vector [sin θ, cos θ]) are added to the smooth directional vector field.

For each vertex in the mesh that is not on a salient boundary segment, the direction vectors for the vertices are aligned based on the boundary conditions. In one or more implementations, the direction vectors are aligned for these vertices to be within a range defined by the boundary conditions, restricting each directional vector in the smooth directional vector field to being within the range defined by the boundary conditions. The angle of each direction vector for a vertex that is on the salient boundary segment is determined relative to a reference vector (e.g., the x-axis or the y-axis). The range defined by the boundary conditions is between (inclusive) a direction vector having the smallest angle relative to the reference vector and a direction vector having the largest angle relative to the reference vector.

For each vertex in the mesh that is not on a salient boundary segment, the vector field generation module determines a direction vector (e.g., represented as a two dimensional vector [sin θ, cos θ]) by solving for the two variables indicating direction (e.g., [sin θ, cos θ]). In one or more implementations, the two variables are solved for using a biharmonic solve with the boundary conditions. As an example, the bi-Laplacian equation is used and the Laplacian energy is minimized subject to the boundary conditions, which are a set of linear constraints. Minimizing the Laplacian energy solves for two weights (the two elements of the two dimensional direction vector).

For each triangle in the mesh, the direction vector for each vertex of the triangle is determined. A triangle is sub-divided into two or ore triangles based on whether the direction vectors at each vertex of the triangle are in approximately the same direction (e.g., within a threshold amount of being in the same direction, such as within 5 degrees of one another). If the direction vectors at each vertex of the triangle are in approximately the same direction, then no sub-dividing of the triangle need be performed. However, if the direction vectors at each vertex of the triangle are not in approximately the same direction, the triangle is sub-divided into two or more triangles. This sub-division of a triangle is performed using any of a variety of public or proprietary techniques. The triangle in the mesh is replaced with the two or more triangles resulting from the sub-dividing, and for each triangle generated from the sub-dividing the direction vector for each vertex of the triangle is determined. This process of sub-dividing triangles is repeated until each triangle in the mesh has its vertices in approximately the same direction.

Triangles in the mesh typically share vertices with at least one other triangle (although exceptions are possible, such as at the corners of the mesh). For a given vertex, a direction vector is generated based on the direction vectors for the vertex as generated for each of the triangles that share the vertex. The direction vector for the shared vertex is determined in any of a variety of different manners. In one or more implementations, one of the direction vectors generated for one of the triangles that share the vertex is selected (e.g., selected randomly, the direction vector closest to the average of the direction vectors generated for the triangles that share the vertex is selected, etc.). Additionally or alternatively, the direction vectors generated for the triangles that share the vertex are combined (e.g., averaged) and that combine value is used as the direction vector for the vertex.

The smooth directional vector field is used to calculate the vector field over a uniform domain, the resultant vector field also being referred to as a uniform vector field. The uniform vector field has consistent or regular distances between different ones of the direction vectors in the uniform vector field, in contrast to the non-uniform smooth directional vector field. Patterns are inherently uniform and regular, so generating the uniform vector field allows the pattern in which the graphical cells are placed to be readily mapped to directional vectors in the uniform vector field.

The smooth directional vector field is to the uniform vector field by superimposing a regular and uniform structure over the smooth directional vector field. The directional vectors are transferred from the vertexes of the smooth directional vector field to the vertexes of the regular and uniform structure. The regular and uniform structure is made up of any of a variety of primitives, which are geometric shapes, such as squares, hexagons, octagons, and so forth. In one or more implementations, the primitives in the structure are adjacent one another. Additionally or alternatively, primitives in the structure are spaced out from one another (e.g., with one or more pixels separation between each primitive and the next closest primitive(s)).

A triangle in the uniform vector field (e.g., a triangle index) corresponding to each vertex of a primitive in the regular and uniform structure is identified. The triangles are identified in various manners, such as using an accelerated bounded volume hierarchy structure. The triangle that corresponds to a vertex of a primitive in the structure is a triangle that includes (e.g., on an edge, vertex, or within the triangle) the vertex of the primitive. In situations in which multiple triangles correspond to a vertex of a primitive, various rules or criteria are applied to determine which triangle corresponds to the vertex (e.g., the triangle that corresponds to the vertex is selected randomly or pseudo-randomly).

A directional vector for each vertex of each primitive in the regular and uniform structure (or at least vertexes in the geometric shape) is determined. In one or more implementations, a directional vector for the vertex of a primitive is generated by combining the directional vectors of the triangle corresponding to the vertex of the primitive. This combining is performed, for example, by computing the local Barycentric coordinates of the position of the vertex of the primitive in the triangle and generating a directional vector for the vertex of the primitive by interpolating the directional vectors of the vertexes of the triangle that corresponds to the vertex of the primitive. Additionally or alternatively, the directional vector for the vertex of the primitive is generated in other manners, such as averaging the vertexes of the triangle that corresponds to the vertex of the primitive, selecting one of the vertexes of the triangle that corresponds to the vertex of the primitive, and so forth.

A graphical cell is placed in each location specified by the pattern. For example, the pattern corresponds to the structure used to generate the uniform vector field, and the graphical cell placement module places the graphical cell in each primitive of the structure that is located inside the geometric shape. A rotational value corresponding to each primitive that is located inside the geometric shape is automatically determined based on the directional vectors (from the uniform vector field) of the vertices of the primitive. In one or more implementations, the rotational value for a primitive is determined by combining (e.g., averaging) the directional vectors of the vertices of the primitive.

For each graphical cell placed in a primitive, an orientation for the graphical cell is determined so that the graphical cell is oriented in the same direction as the rotational value corresponding to the primitive. For example, if the rotational value is 25 degrees from the x-axis for a given primitive, the graphical cell 236 in that primitive is rotated 25 degrees from the x-axis. Accordingly, the orientations for the graphical cell in different primitives vary based on the rotational value corresponding to the primitive.

The techniques discussed herein are discussed with reference to graphical cells being placed in primitives as an example, but additionally or alternatively the techniques discussed herein are applied analogously to filling the geometric shape with other content (e.g., calligrams or microcalligraphy) or assigning values to pixels in the geometric shape (e.g., color flow). In such situations, the content or data placed in (or used to fill) a primitive oftentimes changes for different primitives in contrast to placing the same graphical cell (although with different rotations) in each primitive. As an example, text (e.g., a poem, story, song lyrics, etc.) is placed in the primitives of a shape with the characters (e.g., words) in each primitive rotated analogous to the rotation of a graphical cell as discussed herein. By way of another example, the rotational values are mapped to color values (e.g., ranging between a beginning color and an ending color) and the color of pixels in a particular primitive are set to the color value mapped to the rotational value corresponding to that primitive.

The techniques discussed herein allow a geometric shape to be filled with graphical cells in accordance with a pattern and further automatically rotate the various graphical cells to an orientation aligned with the intrinsic shape of the geometric shape. By aligning the graphical cells with the medial axis of the geometric shape or the salient boundary segments of the geometric shape, the graphical cells are aligned with the intrinsic shape of the geometric shape.

Term Descriptions

These term descriptions are provided for purposes of example only and are not intended to be construed as limiting on the scope of the claims.

The term "medial axis" of a geometric shape refers to a set of points (e.g., all points) in the geometric shape that have more than one closest point on the boundary of the geometric shape.

The term "salient boundary segment" refers to segments or portions of the boundary of a geometric shape that are aligned with the medial axis of the geometric shape. For example, segments of the boundary of the geometric shape having an angle between the segment and the corresponding portion of the medial axis that is less than a threshold number of degrees (with the same or reverse orientations).

The term "graphical cell" refers to a set of one or more pixel values (e.g., a bitmap, vector graphic, single color, or gradient) that is to be replicated at various horizontal and vertical intervals in accordance with a pattern.

The term "pattern" refers to repeated occurrences of graphical cells at various horizontal and vertical intervals. The pattern includes multiple primitives (e.g., rectangles, hexagons, or other polygons) arranged in various manners (e.g., grid or staggered) with zero or more pixels vertically and horizontally between primitives.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

EXAMPLE ENVIRONMENT

FIG. 1 is an illustration of a digital medium environment 100 in an example implementation that is operable to employ the automatically filling a geometric shape with graphical cells aligned with the geometric shape described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, implementations of the computing device 102 range from full resource devices with substantial memory and processor resources (e.g., personal computers, game consoles) to a low-resource device with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 13.

The computing device 102 is illustrated as including an application 104 that includes a fill pattern alignment system 106. The application 104 processes and transforms digital content 108, which is illustrated as maintained in storage 110 of the computing device 102. Such processing includes creation of the digital content 108 and rendering of the digital content 108 in a user interface 112 for output, e.g., by a display device 114. An example 116 of the digital content 108 is displayed in the user interface 112. Although illustrated as being displayed, additionally or alternatively the UI is presented in other manners (e.g., audibly, haptically). The storage 110 is any of a variety of different types of storage, such as random access memory (RAM), Flash memory, solid state drive, magnetic disk drive, and so forth. Although illustrated as implemented locally at the computing device 102, additionally or alternatively functionality of the application 104, including the fill pattern alignment system 106, is implemented in whole or part via functionality available via a network 118, such as part of a web service or "in the cloud."

The computing device 102 also includes an operating system 120 that implements functionality to manage execution of application 104 as well as other applications on the computing device 102, to operate as an interface between the application 104 and hardware of the computing device 102, and so forth. Although the fill pattern alignment system 106 is illustrated as being included in the application 104, additionally or alternatively the fill pattern alignment system 106 is included in the operating system 120.

The fill pattern alignment system 106 implements functionality to fill a geometric shape in digital content with a graphical cell in accordance with a pattern and aligned with the contours of the geometric shape. As illustrated in the example 116 of the digital content 108, the geometric shape 122 is that of a fish and the geometric shape 122 is filled, in accordance with a grid fill pattern, with replications of a graphical cell 124 that is a teardrop shape. The orientation of each graphical cell is aligned with the contours of the geometric shape (e.g., the contour of the fish's body), resulting in different ones of the graphical cells having different orientations based on the location of the graphical cell in the geometric shape.

Although a single application 104 is illustrated in FIG. 1, any number of applications are includable in the computing device 102. Any additional applications included in the computing device 102 optionally include a fill pattern alignment system 106 to manage resource usage by that application.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Fill Pattern Alignment System Architecture

Figure 2:
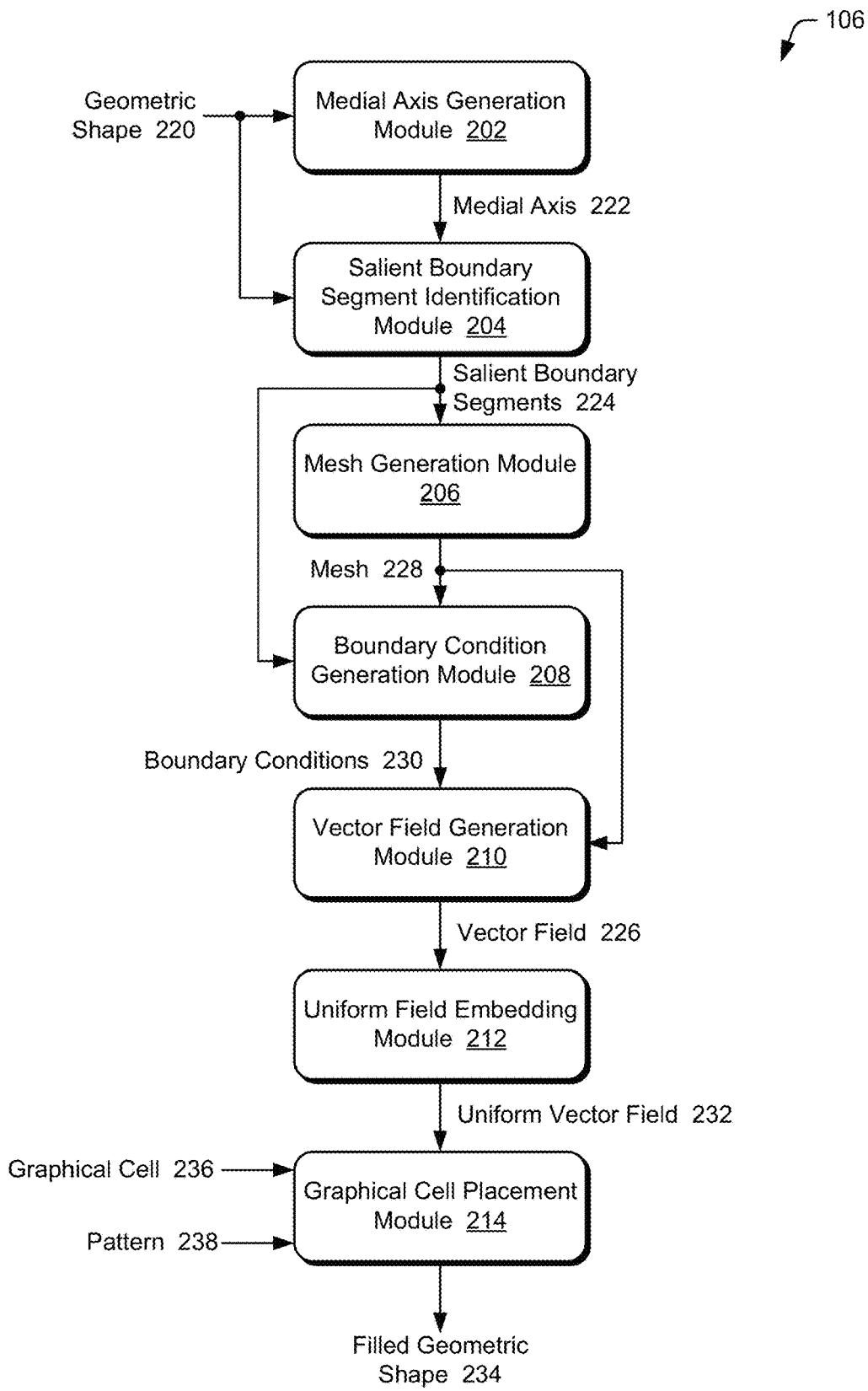
FIG. 2 is an illustration of an example architecture of a fill pattern alignment system.

FIG. 2 is an illustration of an example architecture of a fill pattern alignment system 106. Generally, the fill pattern alignment system 106 implements functionality to fill a geometric shape in digital content with a graphical cell in accordance with a pattern and aligned with the contours of the geometric shape. In one or more implementations, the fill pattern alignment system 106 includes a medial axis generation module 202, a salient boundary segment identification module 204, a mesh generation module 206, a boundary condition generation module 208, a vector field generation module 210, a uniform field embedding uniform field embedding module 212, and a graphical cell placement module 214.

The medial axis generation module 202 implements functionality to receive a geometric shape 220 and generate a medial axis 222 (also referred to as a skeleton or straight-edge skeleton) for the geometric shape 220. The medial axis 222 of the geometric shape 220 is a set of points (e.g., all points) in the geometric shape 220 that have more than one closest point on the boundary of the geometric shape 220. The medial axis 222 identifies the intrinsic shape of the geometric shape 220. The medial axis 222 for the geometric shape 220 is identified using any of a variety of public or proprietary techniques. In one or more implementations, the medial axis 222 is generated by contracting the boundary of the geometric shape 220 inwards. One technique for generating the medial axis 222 is discussed in "Medial axis transformation of a planar shape," by D. Lee, IEEE Transactions on Pattern Analysis and Machine Intelligence, 4:363-9 (1982).

Figure 3:
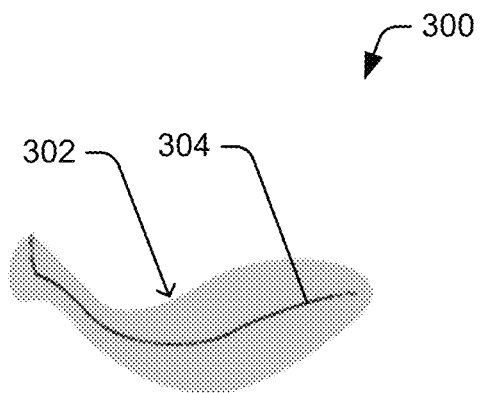
FIG. 3 illustrates an example of a geometric shape and medial axis.

FIG. 3 illustrates an example 300 of a geometric shape and medial axis. The example 300 illustrates a geometric shape 302 in the shape of a fish and having a medial axis 304.

Returning to FIG. 2, situations arise in which the medial axis includes multiple branches. In such situations, the medial axis generation module 202 selects as the medial axis a longest path in the medial axis. Any of a variety of public or proprietary techniques are used to determine the longest path in the medial axis.

Figure 4:
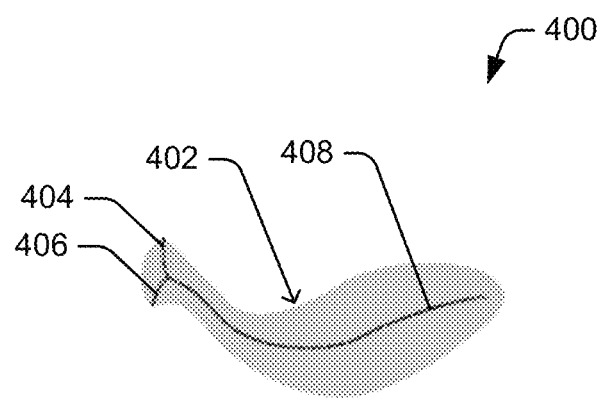
FIG. 4 illustrates an example of a geometric shape and medial axis.

FIG. 4 illustrates an example 400 of a geometric shape and medial axis. The example 400 illustrates a geometric shape 402 in the shape of a fish and having a medial axis that includes two branches 404 and 406. The medial axis generation module 202 selects the longer of the two branches (branch 406 in the illustrated example) and the combination of the initial portion 408 and the branch 406 to use as the medial axis 222 (e.g., illustrated as medial axis 304 of FIG. 3).

Returning to FIG. 2, the salient boundary segment identification module 204 implements functionality to generate salient boundary segments 224 for the geometric shape 220. The salient boundary segments for the geometric shape 220 refer to segments or portions of the boundary of the geometric shape 220 that are aligned with the medial axis 222. The medial axis includes multiple segments (portions of the medial axis). These segments, as well as the boundary segments on the geometric shape 220 that correspond to the segments of the medial axis, are determined by the medial axis generation module 202 as part of determining the medial axis.

Figure 5:
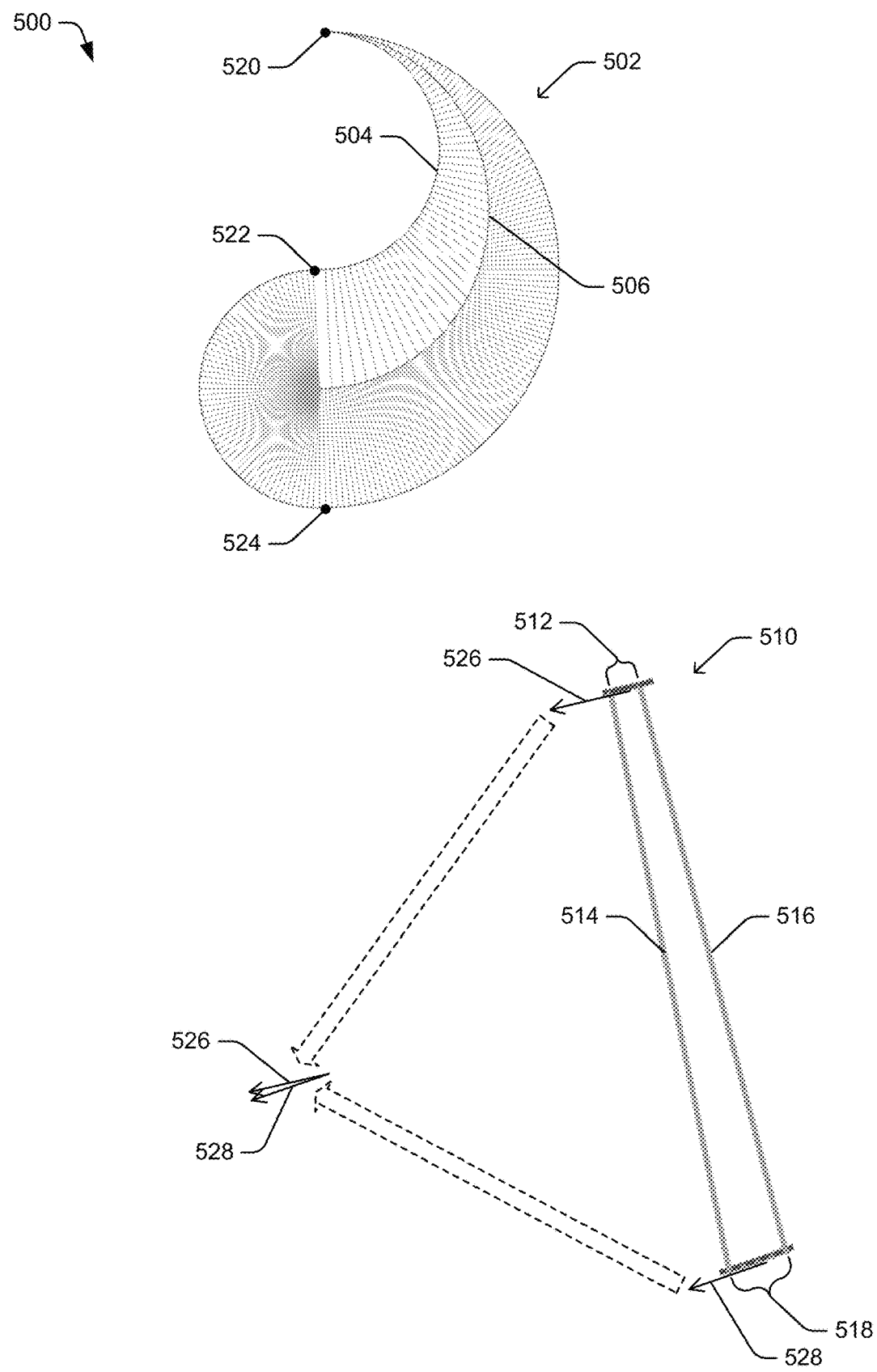
FIG. 5 illustrates an example of a geometric shape.

FIG. 5 illustrates an example 500 of a geometric shape 502. The geometric shape 502 includes a boundary 504, which is a set of one or more lines that define the exterior of the geometric shape 502. A medial axis 506 of the geometric shape 502 is also illustrated. The geometric shape 502 is illustrated as including multiple lines extending from the medial axis 506 to the boundary 504. Each such line intersects the medial axis 506 at a beginning or ending of a segment of the medial axis 506 and extends to a beginning or ending of a corresponding segment of the boundary 504.

Corresponding segments of the medial axis 506 and the boundary 504 are illustrated at 510. A segment 512 on the boundary 504 is illustrated between the intersection of line 514 with the boundary 504 and the intersection of line 516 with the boundary 504. Similarly, a segment 518 on the medial axis 506 is illustrated between the intersection of the line 514 with the medial axis 506 and the intersection of the line 516 with the medial axis 506.

In one or more implementations, the geometric shape 502 is defined using vector graphics and has an associated direction. This associated direction is, for example, from a beginning location where a first line or curve of the geometric shape 502 is defined, following through one or more additional lines or curves of the geometric shape 502, and ending with a line or curve that terminates at the beginning location. For example, the geometric shape 502 is definable using a first curve beginning at location 520 and ending at location 522, a second curve beginning at location 522 and ending at location 524, and a third curve beginning at location 524 and ending at location 520 (the boundary of the geometric shape 502 is these three curves). The direction associated with the geometric shape 502 would thus be in the clockwise direction around the boundary 504.

The medial axis 506 also has an associated direction. The direction of the medial axis 506 is determined in various manners, for example by the medial axis generation module 202 as part of determining the medial axis 506. Another example of the manner in which the direction of the medial axis 506 is determined is according to various rules or criteria, such as a preference for particular directions (e.g., top to bottom and left to right).

The salient boundary segment identification module 204 identifies segments of the boundary of the geometric shape that are aligned with the corresponding segment of the medial axis by comparing a boundary tangential line to a medial axis tangential line. The boundary tangential line is a line that is tangential to, and in the same direction as, a segment of the boundary. The medial axis tangential line is a line that is tangential to, and in the same direction as, the segment of the medial axis. In one or more implementations, if the angle between a boundary tangential line and a corresponding medial axis tangential line is within a threshold range (e.g., less than a threshold amount, such as 45 degrees), then the segment of the boundary of the geometric shape is aligned, with the same orientation, with the corresponding segment of the medial axis. In the example 500, for the segment 512 and corresponding segment 518, the salient boundary segment identification module 204 identifies a line 526 that is tangential to the segment 512 and a line 528 that is tangential to the segment 518. The salient boundary segment identification module 204 determines whether the angle between the line 526 and the line 528 is less than the threshold amount. In the illustrated example, the angle between the line 526 and the line 528 is approximately 6 degrees and salient boundary segment identification module 204 determines that the segment 512 is aligned, with the same orientation, with the segment 518.

Additionally, if the angle between a boundary tangential line and a corresponding medial axis tangential line is between 135 degrees and 225 degrees, the segment of the boundary of the geometric shape is aligned, with reverse orientation, with the corresponding segment of the medial axis. In such situations the salient boundary segment identification module 204 reverses the direction of the boundary tangential line, resulting in the angle between the reversed boundary tangential line and the corresponding medial axis tangential line being within a threshold range (e.g., less than a threshold amount, such as 45 degrees). Accordingly, the reversed boundary tangential line and the corresponding medial axis tangential line are aligned with the same orientation.

Returning to FIG. 2, the fill pattern alignment system 106 computes a smooth directional vector field 226 in the geometric shape 220. This directional vector field is generated by the mesh generation module 206, the boundary condition generation module 208, and the vector field generation module 210 as discussed in more detail below.

The mesh generation module 206 implements functionality to generate a mesh 228 (e.g., a triangular mesh) based on the salient boundary segments 224. In one or more implementations, the mesh generation module 206 identifies a bounding box that includes the geometric shape 220 and generates the mesh 228 for the bounding box. The bounding box is, for example, a rectangle (e.g., a smallest rectangle) that includes all the points of the geometric shape 220. Although a triangular mesh is discussed herein, additionally or alternatively various other meshes (e.g., a quadrilateral mesh) is used.

FIG. 6 illustrates an example 602 of a triangular mesh including generated for a geometric shape having the boundary 504 of FIG. 5. Although illustrated as including triangles within the bounding box of the boundary 504 and internal to our external to the boundary 504, additionally or alternatively the triangular mesh includes only triangles internal to the boundary 504.

Returning to FIG. 2, the mesh generation module 206 generates the mesh 228 using any of a variety of different public or proprietary mesh generation techniques. One example of such a mesh generation technique is constrained Delaunay triangulation (CDT), which is described in additional detail in "Triangle: Engineering a 2D Quality Mesh Generator and Delaunay Tri-angulator" by Jonathan Richard Shewchuk, In Ming C. Lin and Dinesh Manocha, editors, Applied Computational Geometry: Towards Geometric Engineering, volume 1148 of Lecture Notes in Computer Science, pages 203-222, Springer-Verlag, May 1996, from the First ACM Workshop on Applied Computational Geometry, which is hereby incorporated by reference herein in its entirety. In one or more implementations, quality of the mesh is maintained by constraining triangles in the mesh to having no small angles (e.g., the minimum angle in the CDT is constrained to 15 degrees).

The mesh generation module 206 samples points along the geometric shape 220 (e.g., points along the salient boundary segments 224) and includes those points as vertexes in generating the mesh (e.g., adds the sampled points as Steiner points before generating the mesh). The mesh generation module 206 samples these points in accordance with any of a variety of rules or condition. In one or more implementations, a beginning location on the geometric shape 220 is selected (e.g., a point that is the top-most and/or left-most on the geometric shape 220) and included as a sampled point. The geometric shape 220 is traversed point by point (e.g., pixel by pixel) from the beginning location and each additional point is analyzed relative to the previously sampled point. If one or more conditions are satisfied (e.g., the number of points between the current point and the previously sampled point exceeds a threshold number (e.g., 10), the difference between the angle of the tangent to the geometric shape 220 at the current point and the angle of the tangent to the geometric shape at the previously sampled point exceeds a threshold amount (e.g., 3 degrees)) then the current location is included as a sampled point. Otherwise the current location is not included as a sampled point. These threshold numbers or amounts optionally vary along the geometric shape 220 based on whether the current location (or the previously sampled point) is included in a salient boundary segment 224 (e.g., the threshold number or the threshold amount is greater (e.g., double or triple) along portions of the geometric shape 220 that are not salient boundary segments 224 than along portions of the geometric shape 220 that are salient boundary segments 224). By including points along the geometric shape 220 as vertexes in generating the mesh, the vector field generation module 210 is able to account for the boundary of the geometric shape 220 when further analyzing the mesh as discussed in more detail below.

The boundary condition generation module 208 determines boundary conditions used by the vector field generation module 210 in generating the smooth directional vector field 226. The boundary condition generation module 208 receives, and generates boundary conditions 230 from, the salient boundary segments 224 and the mesh 228. The boundary condition generation module 208 determines direction vectors corresponding to the vertices of the mesh 228 that are located on the salient boundary segments 224. The direction vector corresponding to a vertex of the mesh 228 that is located on the salient boundary segments 224 is a vector identifying the direction of the boundary tangential line at that vertex (the direction of a line that is tangential to, and in the same direction as, the segment of the boundary that includes the vertex). The direction vectors corresponding to the vertices are represented in various manners, e.g., as two dimensional vectors [sin θ, cos θ].

Analogous to the discussion above, if the angle between a boundary tangential line at a vertex and a corresponding medial axis tangential line is between 135 degrees and 225 degrees, the segment of the boundary of the geometric shape is aligned, with reverse orientation, with the corresponding segment of the medial axis. In such situations the direction of the boundary tangential line is reversed, resulting in the boundary tangential line being aligned with the same orientation as the corresponding medial axis tangential line resulting in the angle between the reversed boundary tangential line and the corresponding medial axis tangential line being within a threshold range (e.g., less than a threshold amount, such as 45 degrees).

The vector field generation module 210 receives, and generates the smooth directional vector field 226 from, the boundary conditions 230 and the mesh 228. The vector field generation module 210 generates the smooth directional vector field 226 that is aligned with the salient boundary segments 224. The smooth directional vector field 226 being smooth refers to the direction vectors in the smooth directional vector field 226 being similar in direction (e.g., less than a threshold number of degrees different, such as 5 degrees) as adjacent direction vectors in the smooth directional vector field 226. In one or more implementations the smooth directional vector field 226 is generated across the entire mesh 228. Additionally or alternatively, the smooth directional vector field 226 is generated for only portion of the mesh 228 (e.g., portions of the mesh 228 in the interior of the geometric shape 220, including portions of the mesh 228 on the boundary of the geometric shape 220).

For each vertex on a salient boundary segment 224, the vector field generation module 210 uses as the direction vector for the vertex the tangent at the segment of the boundary that includes the vertex (in the same direction as the segment of the boundary or with reverse orientation if the angle between the tangent at the segment and a corresponding medial axis tangential line is between 135 degrees and 225 degrees as discussed above). The vector field generation module 210 adds these direction vectors (e.g., each represented as a two dimensional vector [sin θ, cos θ]) to the smooth directional vector field 226.

For each vertex in the mesh 228 that is not on a salient boundary segment 224, the vector field generation module 210 aligns the direction vectors for the vertices based on the boundary conditions. In one or more implementations, the 210 aligns the direction vectors for these vertices to be within a range defined by the boundary conditions, restricting each directional vector in the smooth directional vector field 226 to being within the range defined by the boundary conditions. The angle of each direction vector for a vertex that is on the salient boundary segment 224 is determined relative to a reference vector (e.g., the x-axis or the y-axis). The range defined by the boundary conditions is between (inclusive) a direction vector having the smallest angle relative to the reference vector and a direction vector having the largest angle relative to the reference vector.

For each vertex in the mesh 228 that is not on a salient boundary segment 224, the vector field generation module 210 determines a direction vector (e.g., represented as a two dimensional vector [sin θ, cos θ]) by solving for the two variables indicating direction (e.g., [sin θ, cos θ]). In one or more implementations, the vector field generation module 210 solves for the two variables using a biharmonic solve with the boundary conditions 230 as boundary conditions.

As an example, the vector field generation module 210 is based on the bi-Laplacian equation and minimizing the Laplacian energy subject to the boundary conditions 230, which are a set of linear constraints. Minimizing the Laplacian energy solves for two weights (the two elements of the two dimensional direction vector) by determining the two weights for each vertex as:

$$\min_{w_i} \sum_{i=1}^{n} \frac{1}{2} \int_{\mathcal{D}} (\Delta w_i)^2 dA$$

where n refers to the number of dimensions in the vector field (2 in this example), $w_i$ refers to the variable representing the weights (the elements of the two dimensional direction vectors) representing the $i^{th}$ unit vector over all mesh vertices in the domain ($\mathcal{D}$).

The vector field generation module 210 determines, for each triangle in mesh 228, the direction vector for each vertex of the triangle. For each triangle, the vector field generation module 210 proceeds based on whether the direction vectors at each vertex of the triangle are in approximately the same direction (e.g., within a threshold amount of being in the same direction, such as within 5 degrees of one another). If the direction vectors at each vertex of the triangle are in approximately the same direction, then no further processing of the triangle need be performed. However, if the direction vectors at each vertex of the triangle are not in approximately the same direction, the vector field generation module 210 sub-divides the triangle into two or more triangles. This sub-division of a triangle is performed using any of a variety of public or proprietary techniques. The triangle in the mesh 228 is replaced with the two or more triangles resulting from the sub-dividing, and for each triangle generated from the sub-dividing the vector field generation module 210 determines the direction vector for each vertex of the triangle. This process of sub-dividing triangles is repeated until each triangle in the mesh 228 has its vertices in approximately the same direction.

Triangles in the mesh 228 typically share vertices with at least one other triangle (although exceptions are possible, such as at the corners of the mesh 228). For a given vertex, the vector field generation module 210 generates a direction vector based on the direction vectors for the vertex as generated by the vector field generation module 210 for each of the triangles that share the vertex. The vector field generation module 210 determines the direction vector for the shared vertex in any of a variety of different manners. In one or more implementations, the vector field generation module 210 selects one of the direction vectors generated for one of the triangles that share the vertex (e.g., selects randomly, selects the direction vector closest to the average of the direction vectors generated for the triangles that share the vertex, etc.). Additionally or alternatively, the vector field generation module 210 combines (e.g., averages) the direction vectors generated for the triangles that share the vertex and uses that combine value as the direction vector for the vertex.

FIG. 6 illustrates an example 604 of a smooth directional vector field generated from a triangle mesh (e.g., as illustrated at example 602). The directional vector field is illustrated as multiple arrows each associated with a vertex of a triangle in the triangle mesh. As illustrated, the smooth directional vector field is aligned with the salient boundary segments of the geometric shape. It is to be noted that (e.g., due to the different sizes of the triangles in the triangle mesh) the smooth directional vector field illustrated in example 604 is not uniform. The vector field not being uniform refers to there being varying distances between different ones of the direction vectors.

Returning to FIG. 2, the uniform field embedding module 212 implements functionality to use the smooth directional vector field 226 to calculate the vector field over a uniform domain, the resultant vector field also being referred to as a uniform vector field 232. The uniform vector field 232 has consistent or regular distances between different ones of the direction vectors in the uniform vector field 232, in contrast to the non-uniform smooth directional vector field 226. Patterns are inherently uniform and regular, so generating the uniform vector field 232 allows the pattern in which the graphical cells are placed to be readily mapped to directional vectors in the uniform vector field 232 as discussed in more detail below.

The uniform field embedding module 212 converts the smooth directional vector field 226 to the uniform vector field 232 by superimposing a regular and uniform structure over the smooth directional vector field 226. The uniform field embedding module 212 transfers the directional vectors from the vertexes of the smooth directional vector field 226 to the vertexes of the regular and uniform structure. The regular and uniform structure is made up of any of a variety of primitives, which are geometric shapes, such as squares, hexagons, octagons, and so forth. In one or more implementations, the primitives in the structure are adjacent one another. Additionally or alternatively, primitives in the structure are spaced out from one another (e.g., with one or more pixels separation between each primitive and the next closest primitive(s)). In one or more implementations, the primitives in the structure are of the same geometric shape as the graphical cells and the spacing between primitives in the structure is the same as the spacing between graphical cells in the pattern.

The uniform field embedding module 212 identifies a triangle in the uniform vector field 232 (e.g., a triangle index) corresponding to each vertex of a primitive in the regular and uniform structure. The uniform field embedding module 212 identifies the triangles in various manners, such as using an accelerated bounded volume hierarchy structure. The triangle that corresponds to a vertex of a primitive in the structure is a triangle that includes (e.g., on an edge, vertex, or within the triangle) the vertex of the primitive. In situations in which multiple triangles correspond to a vertex of a primitive, various rules or criteria are applied to determine which triangle corresponds to the vertex (e.g., the triangle that corresponds to the vertex is selected randomly or pseudorandomly).

The uniform field embedding module 212 determines a directional vector for each vertex of each primitive in the regular and uniform structure (or at least vertexes in the geometric shape 220). In one or more implementations, the uniform field embedding module 212 generates a directional vector for the vertex of a primitive by combining the directional vectors of the triangle corresponding to the vertex of the primitive. This combining is performed, for example, by computing the local Barycentric coordinates of the position of the vertex of the primitive in the triangle and generating a directional vector for the vertex of the primitive by interpolating the directional vectors of the vertexes of the triangle that corresponds to the vertex of the primitive. Additionally or alternatively, the directional vector for the vertex of the primitive is generated in other manners, such as averaging the vertexes of the triangle that corresponds to the vertex of the primitive, selecting one of the vertexes of the triangle that corresponds to the vertex of the primitive, and so forth.

Figure 7:
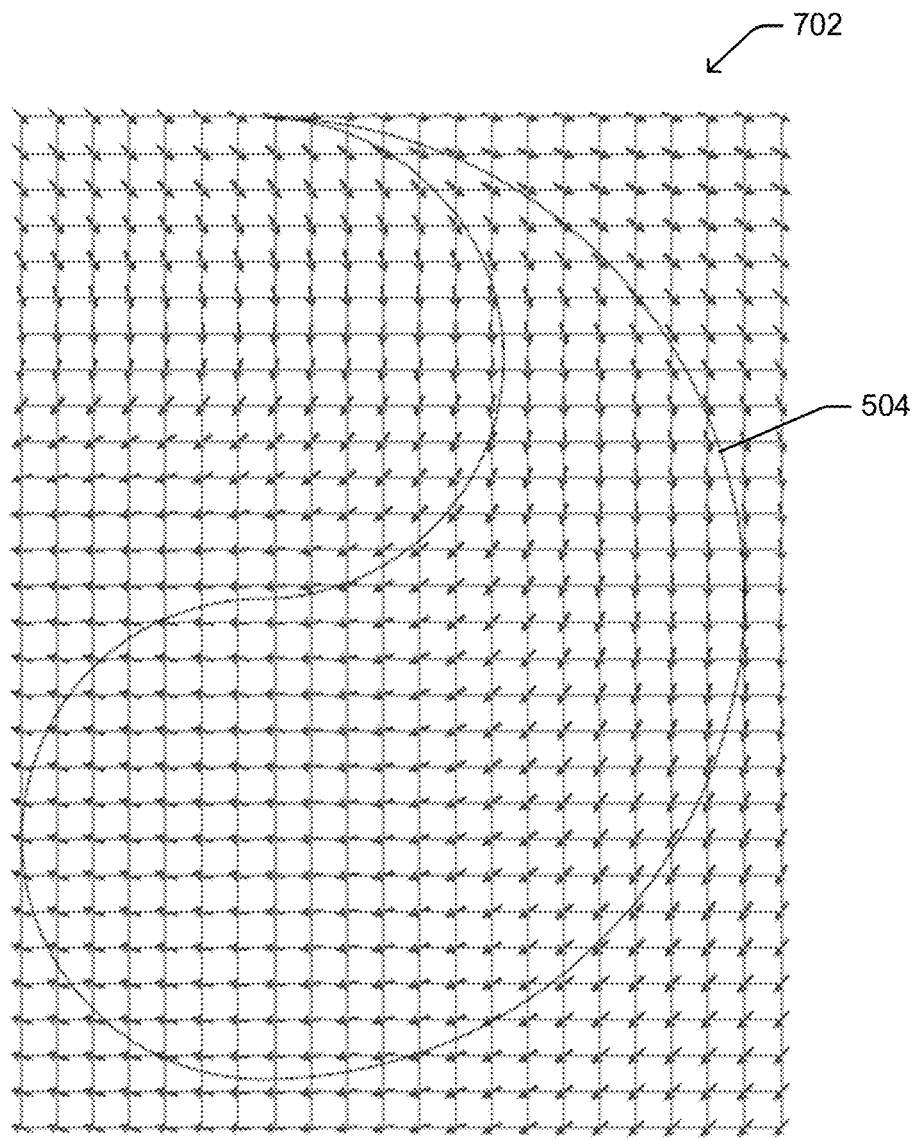
FIG. 7 illustrates an example of a uniform vector field generated from a smooth directional vector field.

FIG. 7 illustrates an example 702 of a uniform vector field generated from a smooth directional vector field (e.g., as illustrated at example 604). The regular and uniform structure is illustrated as multiple squares with no spacing between squares, and the uniform vector field is illustrated as multiple arrows each associated with a vertex of a primitive in the structure.

Returning to FIG. 2, the graphical cell placement module 214 implements functionality to generate a filled geometric shape 234 based on a graphical cell 236, a pattern 238, and the uniform vector field 232. The graphical cell placement module 214 places the graphical cell 236 in each location specified by the pattern 238. For example, the pattern 238 corresponds to the structure used to generate the uniform vector field 232, and the graphical cell placement module 214 places the graphical cell 236 in each primitive of the structure that is located inside the geometric shape 220. The graphical cell placement module 214 determines a rotational value corresponding to each primitive that is located inside the geometric shape 220 based on the directional vectors (from the uniform vector field 232) of the vertices of the primitive. In one or more implementations, the graphical cell placement module 214 determines the rotational value for a primitive by combining (e.g., averaging) the directional vectors of the vertices of the primitive.

For each graphical cell 236 placed in a primitive, the graphical cell placement module 214 determines an orientation for the graphical cell 236 so that the graphical cell 236 is oriented in the same direction as the rotational value corresponding to the primitive. For example, if the rotational value is 25 degrees from the x-axis for a given primitive, the graphical cell placement module 214 rotates the graphical cell 236 in that primitive 25 degrees from the x-axis. Accordingly, the orientations for the graphical cell 236 in different primitives vary based on the rotational value corresponding to the primitive, which is computed above by embedding uniform structure of primitives.

Figure 8:
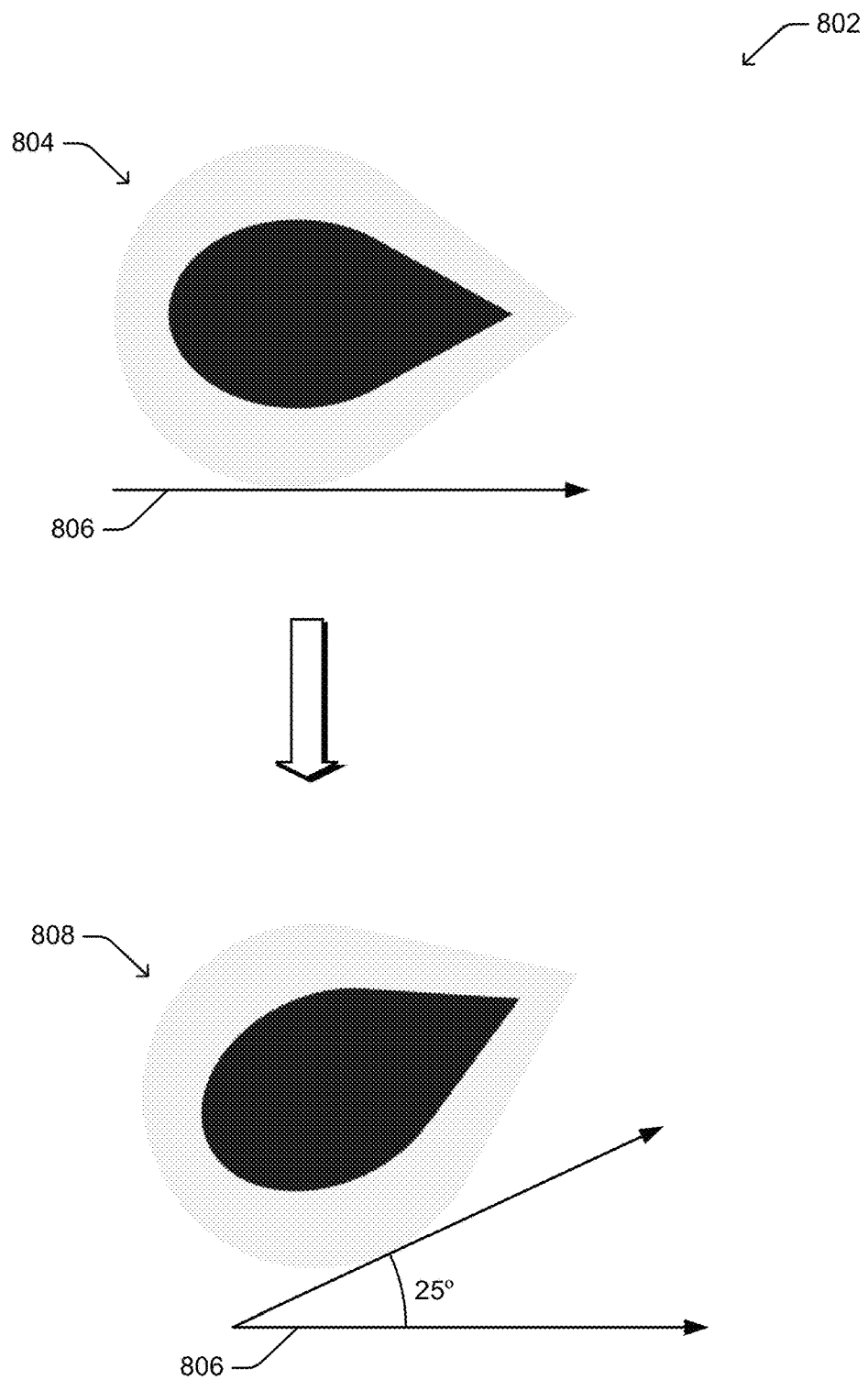
FIG. 8 illustrates an example of rotating a graphical cell.

FIG. 8 illustrates an example 802 of rotating a graphical cell. A graphical cell is illustrated at 804 as a teardrop shape and is initially aligned with the x-axis 806. Assuming that the rotational value corresponding to a primitive in which the graphical cell is placed is 25 degrees, the graphical cell is rotated 25 degrees as illustrated at 808.

Figure 9:
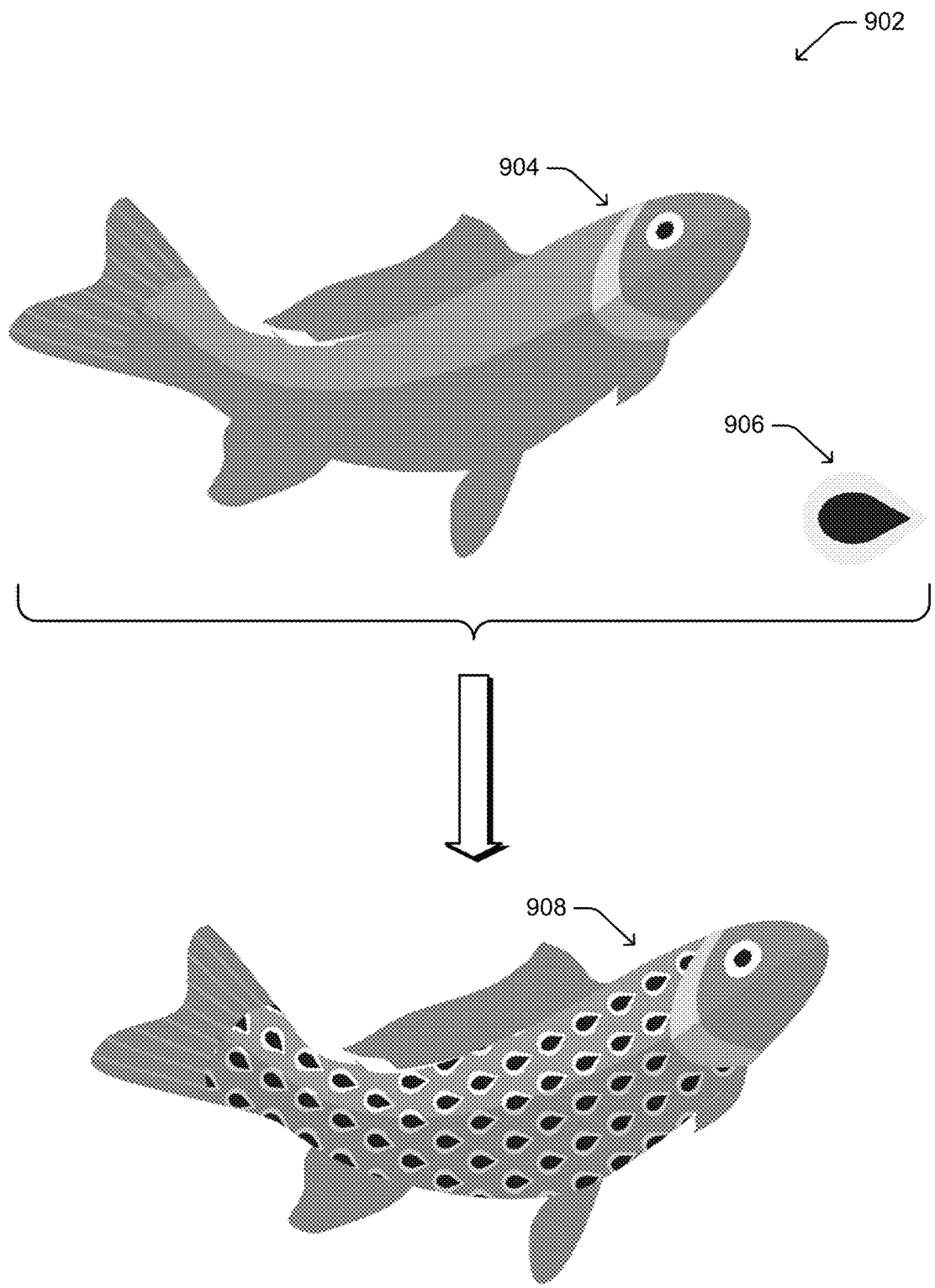
FIG. 9 illustrates an example of generating a filled geometric shape.
Figure 10:
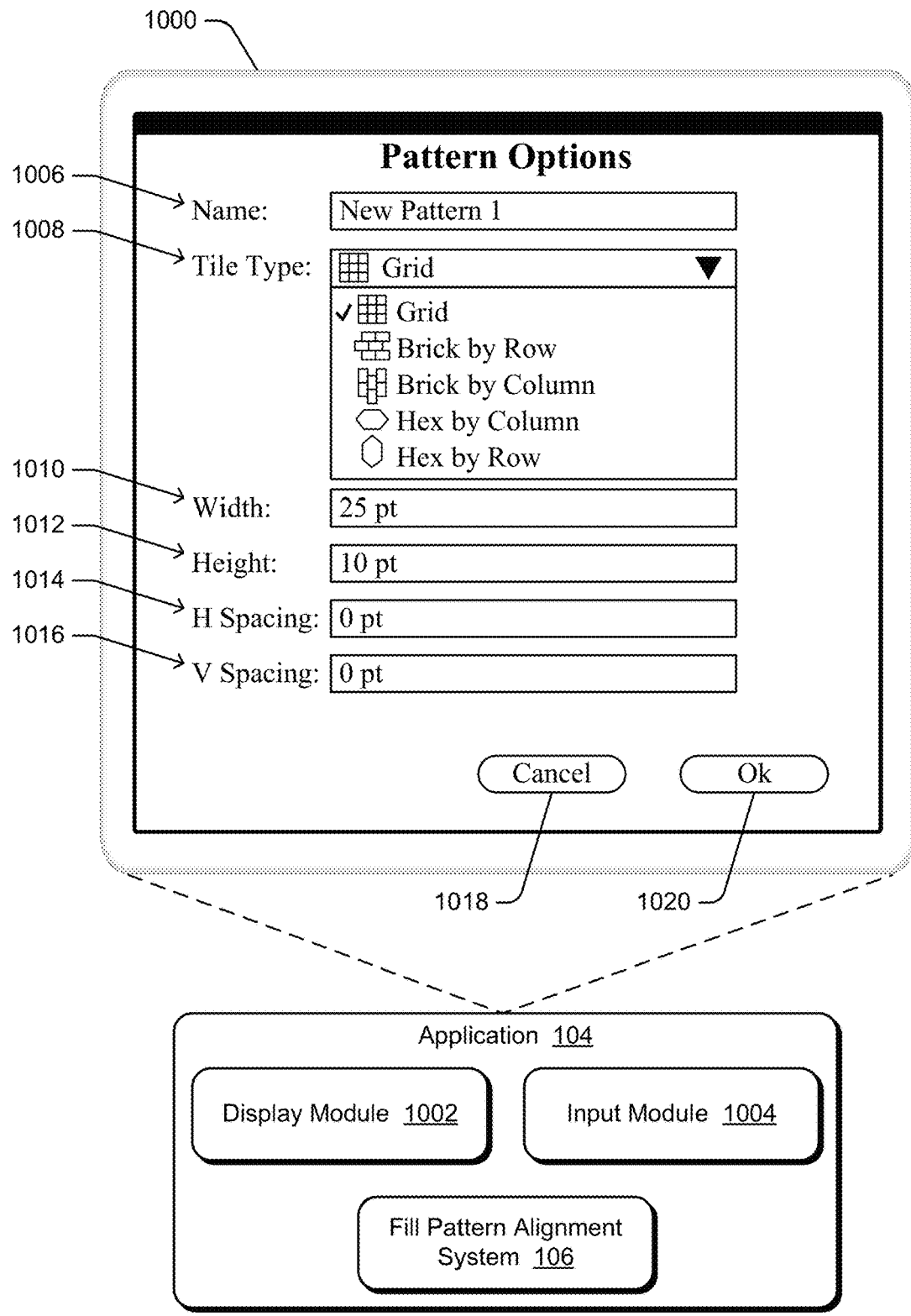
FIG. 10 illustrates an example user interface for receiving user input associated with the techniques discussed herein.

FIG. 9 illustrates an example 902 of generating a filled geometric shape. The example 902 is a larger view of the example illustrated in FIG. 1 and includes a geometric shape 904 is that of a fish and the geometric shape 904 is filled, in accordance with a grid fill pattern, with replications of a graphical cell 906 that is a teardrop shape, resulting in filled geometric shape 908. The orientation of each graphical cell in the filled geometric shape 908 is aligned with the contours of the geometric shape (e.g., the contour of the fish's body), resulting in different ones of the graphical cells having different orientations based on the location of the graphical cell in the geometric shape FIG. 10 illustrates an example user interface 1000 for receiving user input associated with the techniques discussed herein. The application 104 includes a display module 1002 to display the user interface 1000 and an input module 1004 to receive user inputs including various criteria for defining a pattern for graphical cells. The user interface 1000 displays various fields, including a name field 1006 allowing the user to assign a name to a new pattern being created, input a name to retrieve a previously created pattern, and so forth. A tile type field 1008 allows the user to select one of multiple different tile patterns for the pattern. In the illustrated example, the tile type field 1008 includes a drop down menu allowing the user to select a grid pattern (which is the currently selected tile pattern in the illustrated example), a brick by row pattern (rectangular tiles staggered by row), a brick by column pattern (rectangular tiles staggered by column), a hex by column pattern (hexagon tiles having a width longer than their height), and a hex by row pattern (hexagon tiles having a height longer than their width). Additionally or alternatively, various other tile patterns are selectable by the user.

A width field 1010 allows the user to input a width of cells in the pattern, a height field 1012 allows the user to input a height of cells in the pattern, a horizontal spacing (H spacing) field 1014 allows the user to input an amount of spacing horizontally between cells in the pattern, and a vertical spacing (V spacing) field 1016 allows the user to input an amount of spacing vertically between cells in the pattern. A cancel button 1018 allows the user to cancel creation of a new pattern, and an ok button 1020 allows the user to save a newly defined (or modified) pattern.

Returning to FIG. 2, the techniques discussed herein are discussed with reference to graphical cells being placed in primitives as an example, but additionally or alternatively the techniques discussed herein are applied analogously to filling the geometric shape 220 with other content (e.g., calligrams or microcalligraphy) or assigning values to pixels in the geometric shape 220 (e.g., color flow). In such situations, the content or data placed in (or used to fill) a primitive oftentimes changes for different primitives in contrast to placing the same graphical cell 236 (although with different rotations) in each primitive. As an example, text (e.g., a poem, story, song lyrics, etc.) is placed in the primitives of a shape with the characters (e.g., words) in each primitive rotated analogous to the rotation of a graphical cell as discussed herein. By way of another example, the rotational values are mapped to color values (e.g., ranging between a beginning color and an ending color) and the color of pixels in a particular primitive are set to the color value mapped to the rotational value corresponding to that primitive.

Example Procedures

The following discussion describes techniques that are implemented utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-10.

Figure 11:
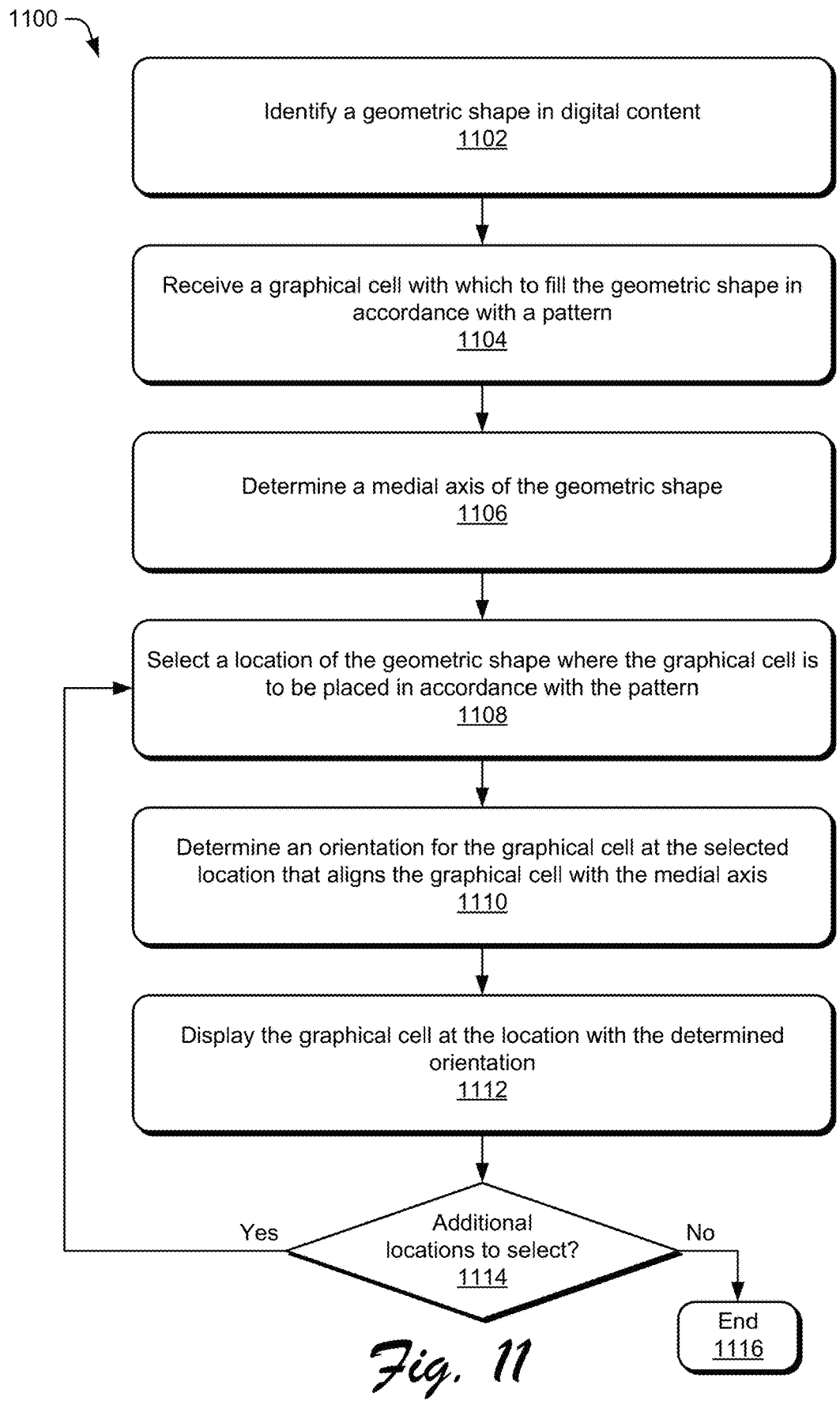
FIG. 11 is a flow diagram depicting a procedure in an example implementation of automatically filling a geometric shape with graphical cells aligned with the geometric shape.

FIG. 11 is a flow diagram 1100 depicting a procedure in an example implementation of automatically filling a geometric shape with graphical cells aligned with the geometric shape. In this example, a geometric shape in digital content is identified (block 1102). The geometric shape takes any of a variety of forms, such as any shape generated using vector graphics, and is oftentimes a closed shape. The geometric shape is identified in any of a variety of manners, such as drawn by a user, selected by the user or another system, and so forth.

A graphical cell with which to fill the geometric shape in accordance with a pattern is received (block 1104). The graphical cell is a set of one or more pixel values (e.g., a bitmap or single color) that is to be replicated at various horizontal or vertical intervals in accordance with the pattern. In one or more implementations, the graphical cell is identified or selected by the user.

A medial axis of the geometric shape is generated (block 1106). The medial axis of the geometric shape refers to a set of points in the geometric shape that have more than one closest point on a boundary of the geometric shape.

A location of the geometric shape where the graphical cell is to be placed in accordance with the pattern is selected (block 1108). Locations of the geometric shape are selected in accordance with any of a variety of rules or criteria, such as top to bottom and left to right, randomly or pseudo-randomly, and so forth.

An orientation for the graphical cell at the selected location is determined (block 1110). The orientation for the graphical cell at the selected location aligns the graphical cell with the medial axis.

The graphical cell is displayed at the location with the determined orientation (block 1112). As there are multiple locations in the geometric shape, at each of the multiple locations the graphical cell is replicated but has the determined orientation for that location.

The procedure proceeds based on whether there are additional locations in the geometric shape to select (block 1114). If all locations in the geometric shape have been selected and a graphical cell displayed at the location, then the procedure ends (block 1116). However, if at least one location in the geometric shape has not yet been selected, the procedure returns to block 1108 to select a location in the geometric shape.

Figure 12:
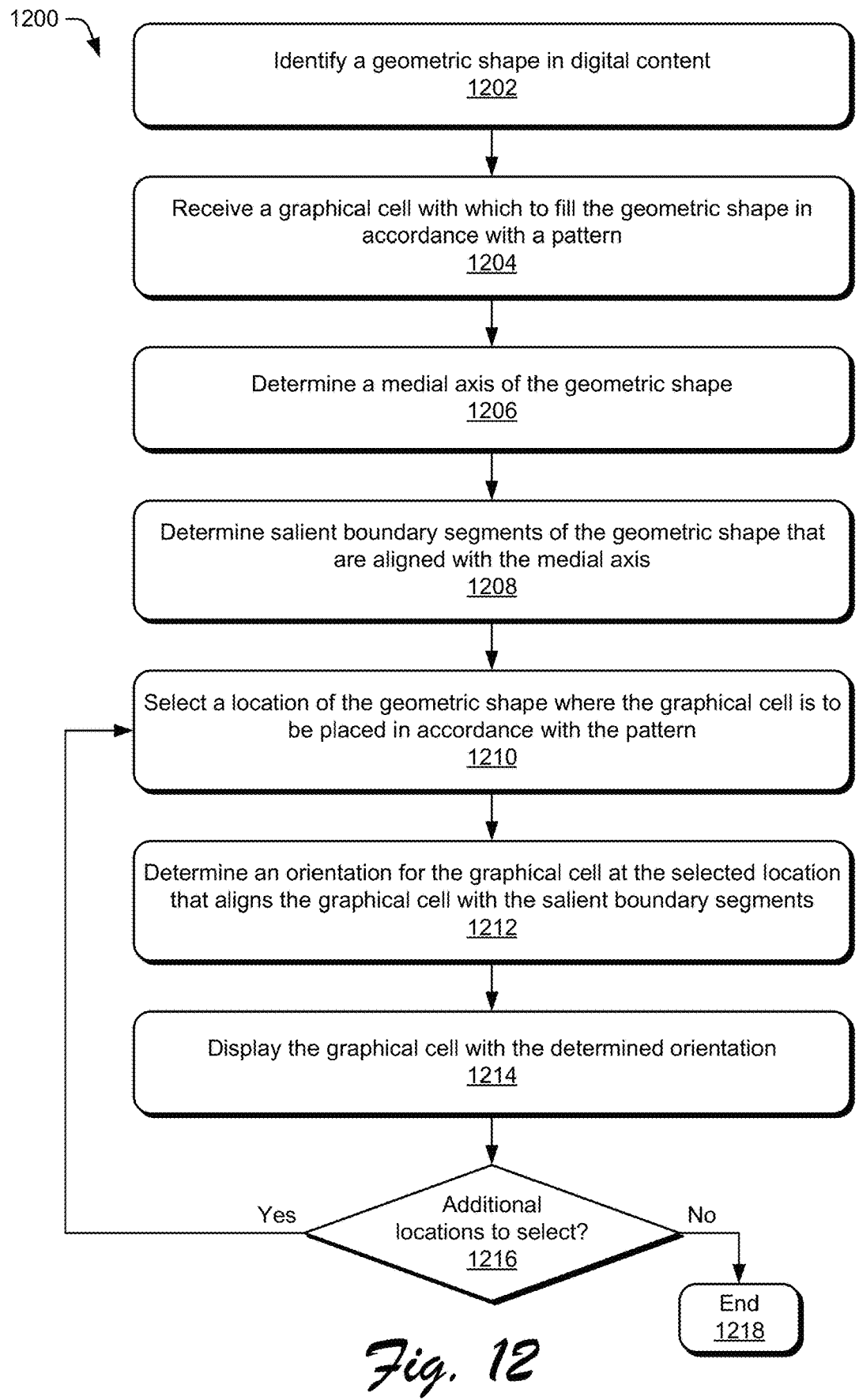
FIG. 12 is another flow diagram depicting a procedure in an example implementation of automatically filling a geometric shape with graphical cells aligned with the geometric shape.

FIG. 12 is a flow diagram 1200 depicting a procedure in an example implementation of automatically filling a geometric shape with graphical cells aligned with the geometric shape. In this example, a geometric shape in digital content is identified (block 1202). The geometric shape takes any of a variety of forms, such as any shape generated using vector graphics, and is oftentimes a closed shape. The geometric shape is identified in any of a variety of manners, such as drawn by a user, selected by the user or another system, and so forth.

A graphical cell with which to fill the geometric shape in accordance with a pattern is received (block 1204). The graphical cell is a set of one or more pixel values (e.g., a bitmap or single color) that is to be replicated at various horizontal or vertical intervals in accordance with the pattern. In one or more implementations, the graphical cell is identified or selected by the user.

A medial axis of the geometric shape is generated (block 1206). The medial axis of the geometric shape refers to a set of points in the geometric shape that have more than one closest point on a boundary of the geometric shape.

Salient boundary segments of the geometric shape are determined (block 1208). The salient boundary segments for the geometric shape are the segments or portions of the boundary of the geometric shape that are aligned with the medial axis.

A location of the geometric shape where the graphical cell is to be placed in accordance with the pattern is selected (block 1210). Locations of the geometric shape are selected in accordance with any of a variety of rules or criteria, such as top to bottom and left to right, randomly or pseudo-randomly, and so forth.

An orientation for the graphical cell at the selected location is determined (block 1212). The orientation for the graphical cell at the selected location aligns the graphical cell with the salient boundary segments.

The graphical cell is displayed at the location with the determined orientation (block 1214). As there are multiple locations in the geometric shape, at each of the multiple locations the graphical cell is replicated but has the determined orientation for that location.

The procedure proceeds based on whether there are additional locations in the geometric shape to select (block 1216). If all locations in the geometric shape have been selected and a graphical cell displayed at the location, then the procedure ends (block 1218). However, if at least one location in the geometric shape has not yet been selected, the procedure returns to block 1210 to select a location in the geometric shape.

Example System and Device

Figure 13:
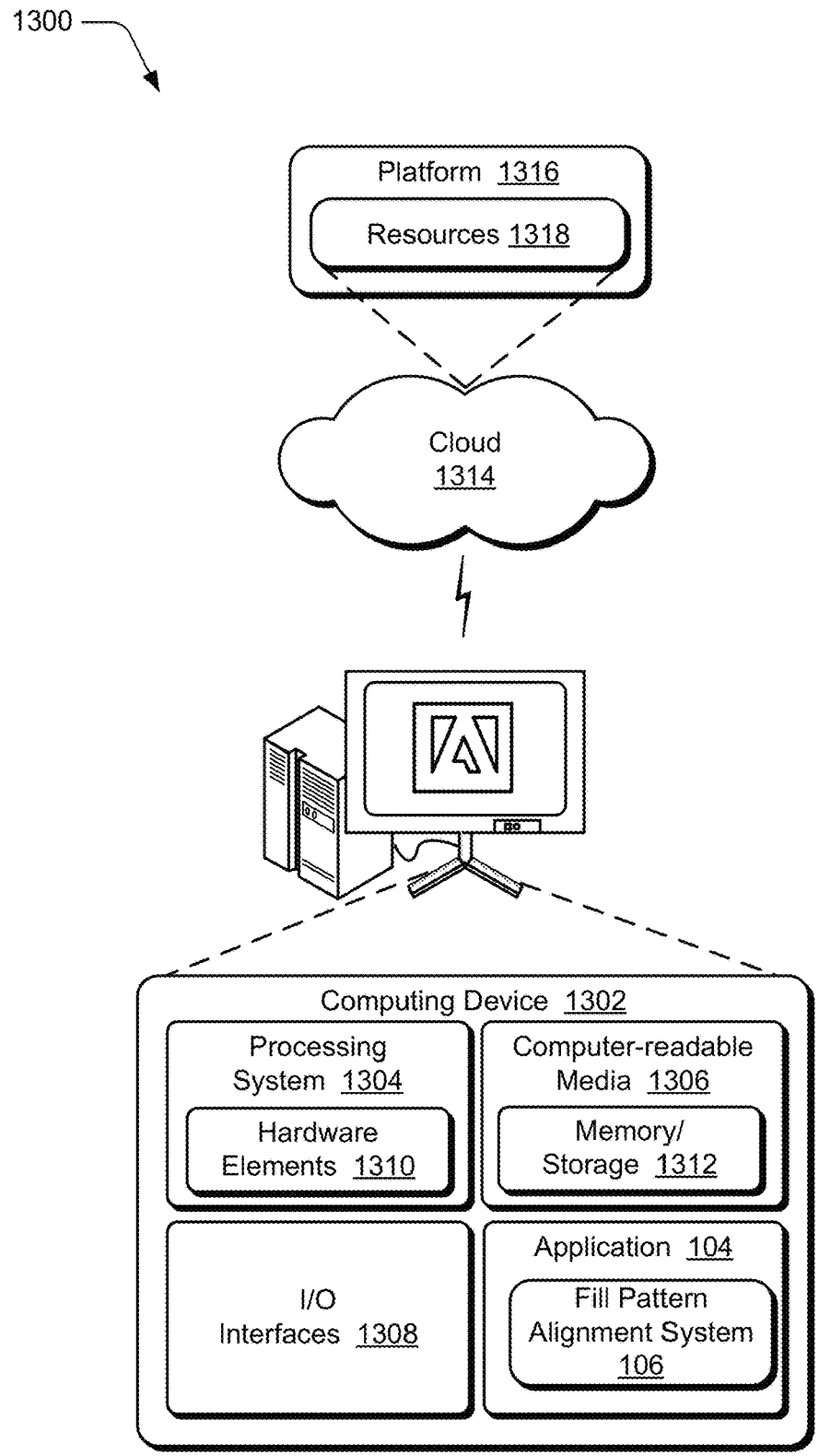
FIG. 13 illustrates an example system including various components of an example device that is implemented as any type of computing device as described and/or utilized with reference to FIGS. 1-12 to implement aspects of the techniques described herein.

FIG. 13 illustrates an example system generally at 1300 that includes an example computing device 1302 that is representative of one or more computing systems and/or devices that implement the various techniques described herein. This is illustrated through inclusion of the application 104 with the fill pattern alignment system 106. The computing device 1302 is, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, in one or more implementations the computing device 1302 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that are configured, for example, as processors, functional blocks, and so forth. The processing system 1304 is optionally implemented in hardware as an application specific integrated circuit or other logic device formed using one or more semiconductors. The hardware elements 1310 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 1306 is illustrated as including memory/storage 1312. The memory/storage 1312 represents memory/storage capacity associated with one or more computer-readable media. The memory/storage component 1312 represents memory/storage capacity associated with one or more computer-readable media. The memory/storage component 1312 includes one or both of volatile media (such as random access memory (RAM)) and nonvolatile media (such as read only memory (ROM), Flash memory, optical disks, magnetic disks, and so forth). The memory/storage component 1312 includes one or both of fixed media (e.g., RAM, ROM, a fixed hard drive, and so on) and removable media (e.g., Flash memory, a removable hard drive, an optical disc, and so forth). The computer-readable media 1306 is optionally configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 1302. By way of example, and not limitation, computer-readable media includes "computer-readable storage media" and "computer-readable signal media."

"Computer-readable storage media" refers to media and/or devices that enable persistent and/or non-transitory storage of information thereon in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achievable at least partially in hardware, e.g., through use of computer-readable storage media and/or hardware elements 1310 of the processing system 1304. The instructions and/or functions executable/operable by one or more articles of manufacture (for example, one or more computing devices 1302 and/or processing systems 1304) to implement techniques, modules, and examples described herein.

The techniques described herein are supported by various configurations of the computing device 1302 and are not limited to the specific examples of the techniques described herein. Additionally or alternatively, this functionality is implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data utilizable while computer processing is executed on servers that are remote from the computing device 1302. Resources 1318 optionally include services provided over the Internet and/or through a subscriber network, such as a cellular or Wi-Fi network.

The platform 1316 abstract resources and functions to connect the computing device 1302 with other computing devices. The platform 1316 also optionally serves to abstract scaling of resources to provide a corresponding level of scale to encountered demand for the resources 1318 that are implemented via the platform 1316. Accordingly, in an interconnected device embodiment, implementation of functionality described herein is distributed throughout the system 1300. For example, the functionality is implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a content creation digital medium environment, a method comprising:
   identifying a geometric shape in digital content;
   receiving a graphical cell with which to fill the geometric shape in accordance with a pattern;
   determining a medial axis of the geometric shape, the medial axis including a set of points in the geometric shape that have more than one closest point on a boundary of the geometric shape;
   for each of multiple locations of the geometric shape where the graphical cell is to be placed in accordance with the pattern:
      determining, based at least in part on the medial axis, an orientation for the graphical cell at the location that aligns a reference vector of the graphical cell with the medial axis; and
      displaying, at the location, the graphical cell with the determined orientation.

2. The method of claim 1, the determining the orientation for the graphical cell including identifying salient boundary segments on the boundary of the geometric shape, each salient boundary segment being aligned with the medial axis.

3. The method of claim 2, the identifying salient boundary segments including identifying, as the salient boundary segments, each boundary segment on the boundary of the geometric shape for which an angle between a boundary tangential line for the boundary segment and a medial axis tangential line for a corresponding tangential line for the medial axis is less than a threshold amount.

4. The method of claim 2, the determining the orientation for the graphical cell including generating a smooth directional vector field in an interior of the geometric shape.

5. The method of claim 4, further comprising generating a triangular mesh in the geometric shape and including, in the smooth directional vector field, directional vectors at each triangle vertex in the triangular mesh.

6. The method of claim 5, further comprising identifying a range of directional vectors defined by the directional vectors of triangles on the salient boundary segments, and restricting each directional vector in the smooth directional vector field to being within the range of directional vectors.

7. The method of claim 5, the smooth directional vector field comprising a non-uniform vector field, the method further comprising converting the smooth directional vector field into a uniform vector field corresponding to the pattern.

8. The method of claim 7, the determining the orientation for the graphical cell comprising setting the orientation for the graphical cell to be an orientation of the directional vector in the uniform vector field corresponding to the location.

9. The method of claim 7, wherein the non-uniform vector field includes varying distances between different ones of the directional vectors, and the uniform vector field includes consistent distances between the different ones of the directional vectors.

10. The method of claim 2, wherein identifying the salient boundary segments includes identifying the salient boundary segments along a portion of the boundary of the geometric shape.

11. The method of claim 1, further comprising receiving user input specifying the geometric shape, the pattern, and the graphical cell.

12. In a content creation digital medium environment, a computing device comprising:
   a memory component; and
   a processing device coupled to the memory component, the processing device to perform operations including:
      identifying a geometric shape in digital content;
      receiving a graphical cell with which to fill the geometric shape in accordance with a pattern;
      determining a medial axis of the geometric shape, the medial axis including a set of points in the geometric shape that have more than one closest point on a boundary of the geometric shape;
      determining salient boundary segments of the geometric shape that are aligned with the medial axis;
      for each of multiple locations of the geometric shape where the graphical cell is to be placed in accordance with the pattern:
         determining an orientation for the graphical cell at the location that aligns a reference vector of the graphical cell with the salient boundary segments of the geometric shape; and
         displaying, at the location, the graphical cell with the determined orientation.

13. The computing device of claim 12, the identifying salient boundary segments including identifying, as the salient boundary segments, each boundary segment on the boundary of the geometric shape for which an angle between a boundary tangential line for the boundary segment and a medial axis tangential line for a corresponding tangential line for the medial axis is less than a threshold amount.

14. The computing device of claim 12, the determining the orientation for the graphical cell including generating a smooth directional vector field in an interior of the geometric shape.

15. The computing device of claim 14, the operations further including generating a triangular mesh in the geometric shape and including, in the smooth directional vector field, directional vectors at each triangle vertex in the triangular mesh.

16. The computing device of claim 15, the operations further including identifying a range of directional vectors defined by the directional vectors of triangles on the salient boundary segments, and restricting each directional vector in the smooth directional vector field to being within the range of directional vectors.

17. The computing device of claim 15, the smooth directional vector field comprising a non-uniform vector field, the operations further comprising converting the smooth directional vector field into a uniform vector field corresponding to the pattern.

18. The computing device of claim 17, the determining the orientation for the graphical cell comprising setting the orientation for the graphical cell to be an orientation of the directional vector in the uniform vector field corresponding to the location.

19. The computing device of claim 12, the operations further including receiving user input specifying the geometric shape, the pattern, and the graphical cell.

20. A non-transitory computer-readable medium storing executable instructions, which when executed by a processing device, initiate the processing device to perform operations comprising:
   receiving an indication of a geometric shape in digital content, a pattern, and a graphical cell with which to fill the geometric shape in accordance with the pattern;
   determining a medial axis of the geometric shape, the medial axis including a set of points in the geometric shape that have more than one closest point on a boundary of the geometric shape;
   generating a smooth directional vector field in an interior of the geometric shape and converting the smooth directional vector field to a uniform vector field;
   setting, for each of multiple locations of the geometric shape where the graphical cell is to be placed based on the pattern, an orientation for the graphical cell to be an orientation of a directional vector in the uniform vector field corresponding to the location; and
   displaying the graphical cell with the determined orientation.

\* \* \* \* \*